(12) United States Patent
Limousin

(10) Patent No.: US 6,772,575 B2
(45) Date of Patent: Aug. 10, 2004

(54) SHRINK WRAP APPARATUS AND METHOD OF SHRINK WRAPPING PRODUCTS

(75) Inventor: Jean-Louis Limousin, Louisville, KY (US)

(73) Assignee: Lantech Management Corp. and Lantech Holding Corp., Louisville, KY (US)

(*) Notice: Subject to any disclaimer, the term of this patent is extended or adjusted under 35 U.S.C. 154(b) by 0 days.

(21) Appl. No.: 10/331,863

(22) Filed: Dec. 30, 2002

(65) Prior Publication Data

US 2004/0123566 A1 Jul. 1, 2004

(51) Int. Cl.[7] .............................................. B65B 53/06
(52) U.S. Cl. ............................ 53/442; 53/557; 34/545; 198/459.5
(58) Field of Search ................. 53/442, 557; 34/236, 34/545; 198/459.5, 782, 837, 841, 952

(56) References Cited

U.S. PATENT DOCUMENTS

| | | | |
|---|---|---|---|
| 3,312,811 A | | 4/1967 | Shanklin |
| 3,342,306 A | * | 9/1967 | Fabbri ......................... 53/557 |
| 3,627,099 A | * | 12/1971 | Shaffer ........................ 198/782 |
| 3,807,126 A | * | 4/1974 | Schwarz ....................... 53/442 |
| 3,808,767 A | * | 5/1974 | Reid ............................. 53/442 |
| 4,060,957 A | * | 12/1977 | Birkenfeld et al. ........... 53/442 |
| 4,219,988 A | | 9/1980 | Shanklin et al. |
| 4,263,725 A | | 4/1981 | Ganz |
| 4,597,193 A | | 7/1986 | Kallfass |
| 4,724,652 A | * | 2/1988 | Birkenfeld ................... 53/557 |
| 4,845,918 A | * | 7/1989 | Klupfel et al. ................ 53/557 |
| 4,947,605 A | | 8/1990 | Ramsey |
| 4,956,963 A | | 9/1990 | Johnson |
| 5,009,057 A | | 4/1991 | Wilkinson |
| 5,740,659 A | | 4/1998 | Cox et al. |
| 5,813,512 A | * | 9/1998 | Andersson et al. ...... 198/459.5 |
| 5,850,723 A | | 12/1998 | Kallfass |
| 5,899,048 A | * | 5/1999 | Havens et al. ................ 53/442 |
| 6,109,428 A | * | 8/2000 | Harm ......................... 198/841 |
| 6,193,052 B1 | * | 2/2001 | Cloud et al. ................ 198/841 |

OTHER PUBLICATIONS

Two pictures (perspective and an end view) VERSAview 500 Tunnel sold by Automation Packaging, Inc. (1998–2001).
One picture (perspective view) of APTU 50 DV sold by Automation Packaging, Inc. (1990–1998).
One picture (front view) of VST 1700 tunnel sold by Hi Tech (1994–1998).
Q–Series brochure from Lantech, Inc., LD# 1506 (6 pages) (copyright 1996).
Two pictures of conveyor portion of a Shanklin tunnel.

* cited by examiner

Primary Examiner—John Sipos
(74) Attorney, Agent, or Firm—Wood, Herron & Evans, L.L.P.

(57) ABSTRACT

A tunnel for shrink wrapping at least one product includes a housing having an interior space with a top, a bottom, an entrance and an exit. A conveyor belt passes through the interior space from the entrance to the exit. The conveyor belt is substantially unobstructed on upper and lower sides and includes an opened configuration allowing substantial air flow therethrough at relatively low velocity. Heaters and air movers are located above and below the conveyor belt to uniformly heat products contained in shrink film and moving along the conveyor belt. The shrink tunnel further includes an adjustable riser member to allow a transverse section of the conveyor belt to be selectively adjusted in height from outside the housing.

11 Claims, 3 Drawing Sheets

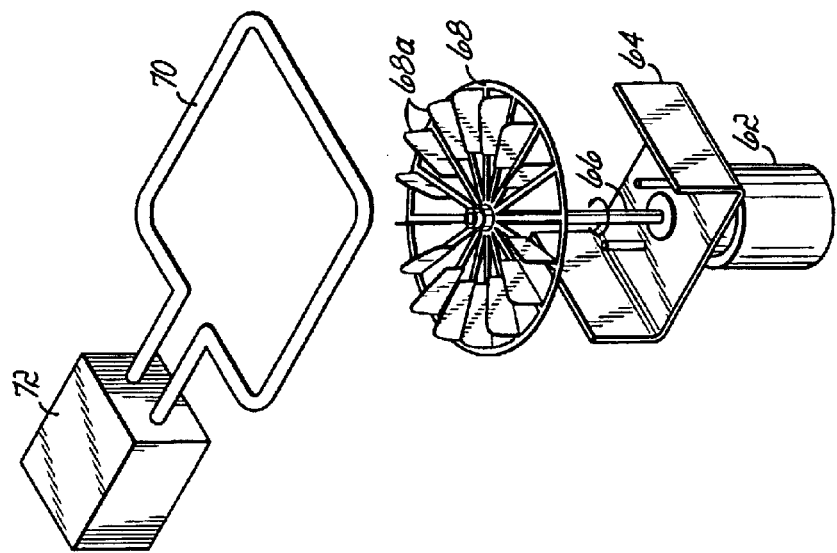
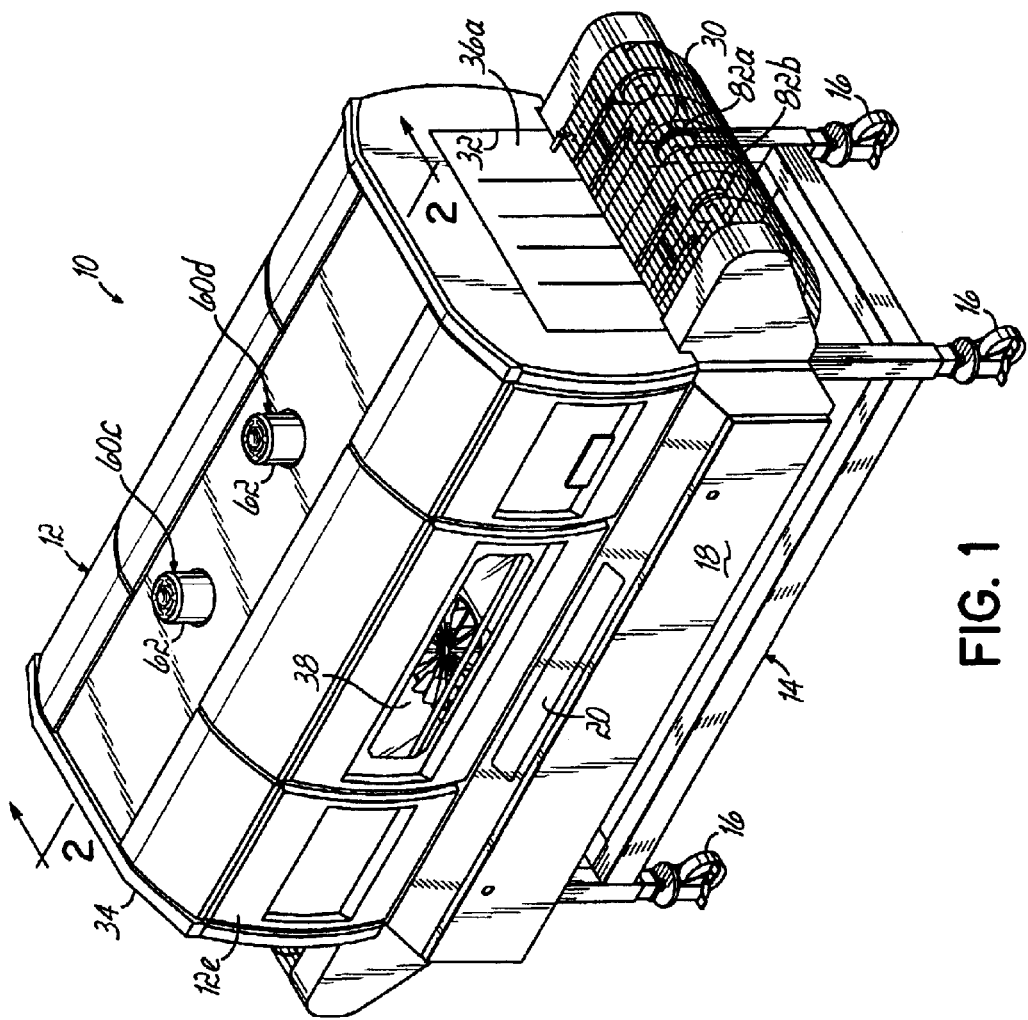
FIG. 4
FIG. 1

SHRINK WRAP APPARATUS AND METHOD OF SHRINK WRAPPING PRODUCTS

FIELD OF THE INVENTION

The present invention generally relates to packaging apparatus and methods and, more particularly, to shrink wrapping apparatus and methods in which a plastic film shrinks tightly around one or more products.

BACKGROUND OF THE INVENTION

Various methods and apparatus have been employed to shrink a plastic film about one or more products during an assembly line packaging operation. The products may be in many different forms and package configurations. Most notably, these apparatus typically comprise forced air ovens or other tunnel structures through which a conveyor passes. The products, which are encased in a loose plastic shrink film and then placed on the conveyor, pass through the oven or tunnel structure. As they are heated, for example, by a forced air system or other types of heaters, the film shrinks tightly about the product or products. The timing is such that the shrink process occurs as the product or products are traveling from the entrance to the exit of the oven or tunnel.

Ideally, the shrink wrap will uniformly shrink about the outer surface of the product or products with minimal distortion of the film. However, this is especially difficult with products that have irregular shapes. With such products, the shrink film may contact certain areas of the outer surface of the product and may not contact other areas of the outer surface. The problem is further complicated by the fact that many ovens and tunnels have "hot spots" and "cold spots" due to uneven heat distribution within the oven or tunnel interior. For example, ovens that use forced air typically introduce the air into the oven interior through a duct and use various baffles which may be adjustable in an attempt to uniformly distribute the heated air throughout the interior of the oven. This adjustment procedure is often more of an art than a science and, especially when faced with small production runs, the adjustment process becomes even more difficult, inefficient, time consuming and therefore costly. Adjustments must properly balance the temperature, conveyor speed, and air flow through the various ducts and baffle structure. Often, this adjustment process can take up to several hours before achieving consistent shrink wrapped products of a quality acceptable to the customer. As mentioned above, this time consumption is especially impractical and costly for small production runs.

One specific aspect of prior ovens or tunnels which presents certain problems is the riser bar used to raise a short section of the conveyor within the oven or tunnel. These riser bars are used to briefly lift each product during its travel through the oven or tunnel as an aid to more uniformly distribute and control the bubble or balloon-like effect that briefly occurs in the shrink film during the shrink wrap process. As the product is briefly lifted off the conveyor at the riser bar location, the weight of the product is taken off the underlying shrink film. This reduces or eliminates grid marks in the film otherwise caused by the conveyor. Prior riser bars suffer from two general drawbacks. First, the conveyor rubs over the riser bar and, eventually, the friction wears down the riser bar making it less useful and in need of replacement. Second, the riser bar is of fixed diameter and, therefore, may work effectively only across a limited variety of product sizes and configurations run through the tunnel.

To address these concerns as well as other concerns in the shrink wrap field, it would be desirable to provide a shrink tunnel requiring little or no adjustments to be made to achieve high quality shrink wrapping of a wide range of product configurations and sizes. It would also be desirable to provide a shrink tunnel having an adjustable riser member allowing the elevation of a section of the conveyor to be changed in accordance with different product configurations, sizes and weights.

SUMMARY OF THE INVENTION

Generally, the invention relates to an apparatus for shrink wrapping at least one product and including a housing having an interior space with a top, a bottom, an entrance and an exit. The product may or may not be included in another container or package during the shrink wrap process. A heater is thermally coupled to the interior space and a first air mover can be operatively coupled with the interior space and configured to move air generally around the interior space and through the open area of the conveyor belt. A conveyor belt passes through the interior space from the entrance to the exit and preferably comprises an open configuration, such as a mesh configuration.

In one main aspect of the invention, an adjustable riser member is coupled to the conveyor belt and is adjustable in height to raise and lower a transverse section of the conveyor belt. For example, the transverse section of the conveyor belt may be raised higher for larger and/or heavier products and may be raised to a lesser extent for smaller and/or lighter products. For very lightweight products or products which are more prone to tip over, the riser member may be adjusted so that the conveyor remains flat. In the preferred embodiment, the riser member is a bar or shaft extending transverse to the conveyor belt, and optionally including at least one roller engaging the conveyor belt. As another desirable feature, the riser member is adjustable from outside the housing for ease of use by the operator. The conveyor belt is preferably a free tension belt, i.e., one that is mounted and moves under little or no tension. This ensures that the belt height may be easily adjusted without placing the conveyor belt or the riser member under undesirable stress. It will be appreciated that this feature may be incorporated into any type of shrink wrap apparatus.

The openly configured conveyor belt is substantially unobstructed on upper and lower sides thereof as it travels within the housing. For example, the conveyor belt may be supported by the riser member or bar extending across one generally central section thereof transverse to the conveyor path and may also be supported by thin underlying rods.

In accordance with the preferred embodiment, respective upper and lower heaters are located above and below the conveyor belt and are constructed generally as assemblies with the air movers which may comprise fan blades. In another aspect of the invention, the fan blades have at least substantially no pitch. For that reason, the fans do not forcefully direct air at the products moving along the conveyor belt but rather move the air generally uniformly and with relatively low velocity within the interior space of the tunnel. This helps to ensure that no "hot spots" or "cold spots" are created within the interior space of the tunnel.

In accordance with another aspect of the invention, the conveyor belt is positioned closer to a mid-point between the upper heater and the lower heater than to the upper and lower heaters themselves. Due to this generally central positioning of the conveyor belt between the upper and lower heaters, the products moving along the conveyor belt are more uniformly heated on their upper and lower sides. The same spatial relationship also preferably exists between the top and bottom walls of the tunnel housing and the conveyor. This general aspect of the invention furthers the goal of shrinking the plastic film about the product or products without burning the film or producing unacceptable distortions of the film.

The present invention further contemplates various methods of shrink wrapping at least one product including the various operations of the tunnel described hereinabove either taken alone or in any of their various combinations in accordance with the needs of the user.

These and other features, objects and advantages will become more readily apparent to those of ordinary skill in the art upon review of the following detailed description taken in conjunction with the accompanying drawings.

BRIEF DESCRIPTION OF THE DRAWINGS

FIG. 1 is a perspective view of a shrink tunnel constructed in accordance with the preferred embodiment of the invention.

FIG. 4 is an exploded perspective view of one of the air mover and heater assemblies.

DETAILED DESCRIPTION

Figure 2:
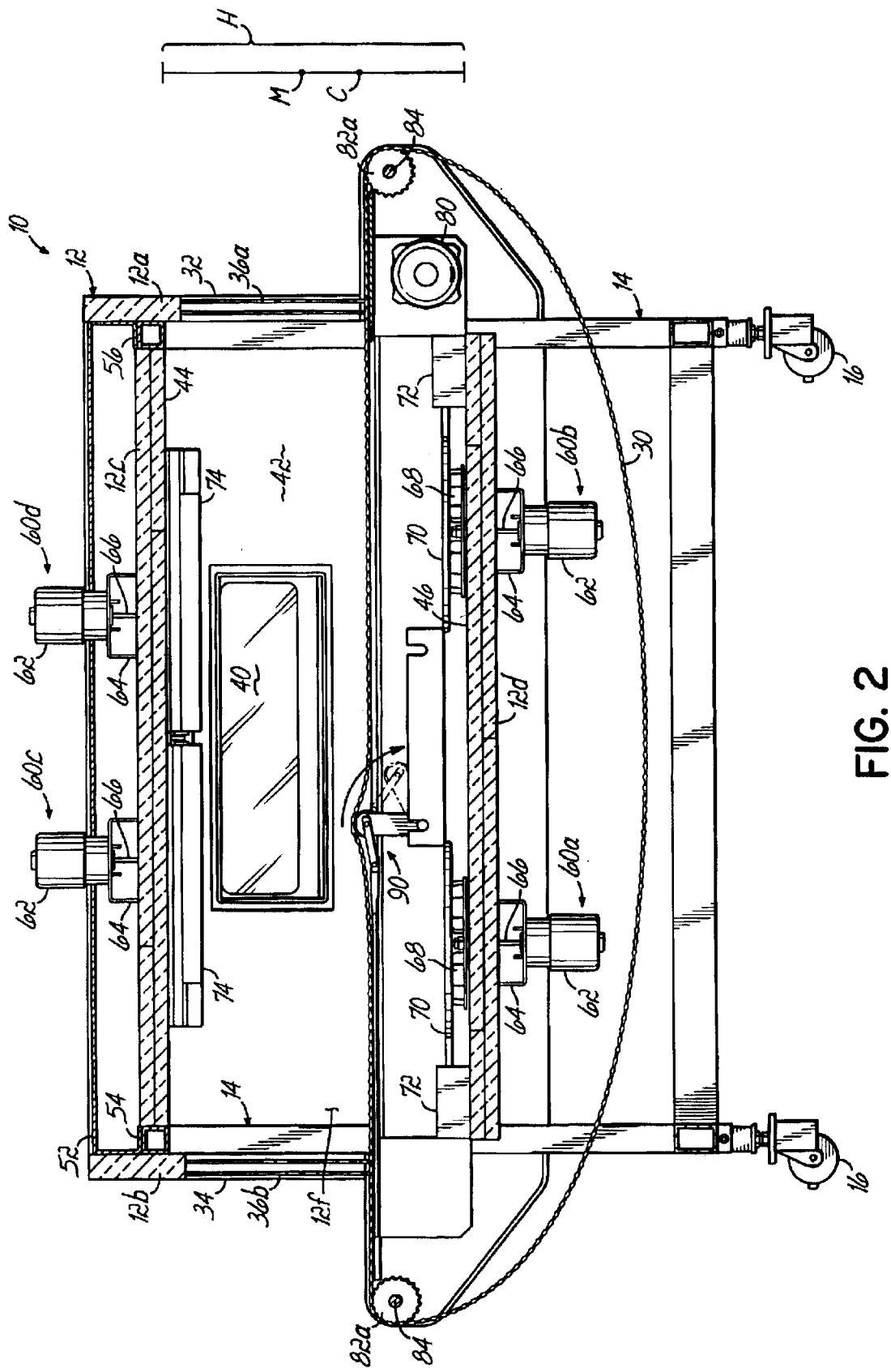
FIG. 2 is a cross sectional view taken along line 2—2 of FIG. 1.

FIGS. 1–4 illustrate one preferred embodiment of the invention, including its several aspects. As shown generally in FIG. 1, shrink tunnel 10 includes an insulated housing or chamber 12. As shown further in FIG. 2, insulated housing 12 more specifically comprises end walls 12a, 12b and top and bottom walls 12c, 12d. Likewise, side walls 12e, 12f are thermally insulated, although these walls are not shown in cross section. Each of the walls 12a–f are preferably formed by an insulating material sandwiched between sheet metal layers. As further shown in FIGS. 1 and 2 shrink tunnel 10 is supported by a frame structure 14 which may ride on lockable caster wheels 16. A control box 18 is provided for housing heating and motor controls of shrink tunnel 10. Such controls are conventional and well known to those of ordinary skill and therefore are not detailed herein. A control panel 20 is provided for the operator controls.

A conveyor belt 30 is provided and is preferably constructed with an open mesh-like construction. More specifically, conveyor belt 30 is preferably formed such that it provides at least 80% open area to allow heated air to pass through during the shrink wrap operation. Housing 12 includes an entrance opening 32 and an exit opening 34 (best shown in FIG. 2). The entrance and exit openings 32, 34 are obstructed by high temperature flexible covers or flaps 36a, 36b which are slitted to allow for products (not shown) to easily pass through. Covers or flaps 36a, 36b help retain the heated air within the interior of housing 12. A centrally located window 38 is provided above the control panel 20 to allow an operator to observe the products as they pass through tunnel 10 during the shrink wrap process. A second window 40 may also be provided on the opposite side of housing 12.

More specifically referring to FIG. 2, housing 12 includes an interior 42 having a top 44 and a bottom 46. Conveyor 30 passes through interior 42 at a height "C" which is closer to the mid-point "M" of the total interior height "H" than to either the top 44 or bottom 46 of interior 42. This has been found to provide more even heating of products traveling through interior 42 on conveyor belt 30 in the present configuration due especially to the more centralized location of the products relative to the various heaters to be discussed below. As further shown in FIG. 2, various additional frame members, such as frame members 14, 54, 56 secure the end walls 12a, 12b and top wall 12c together. A top cover 52 is provided as well.

Figure 3:
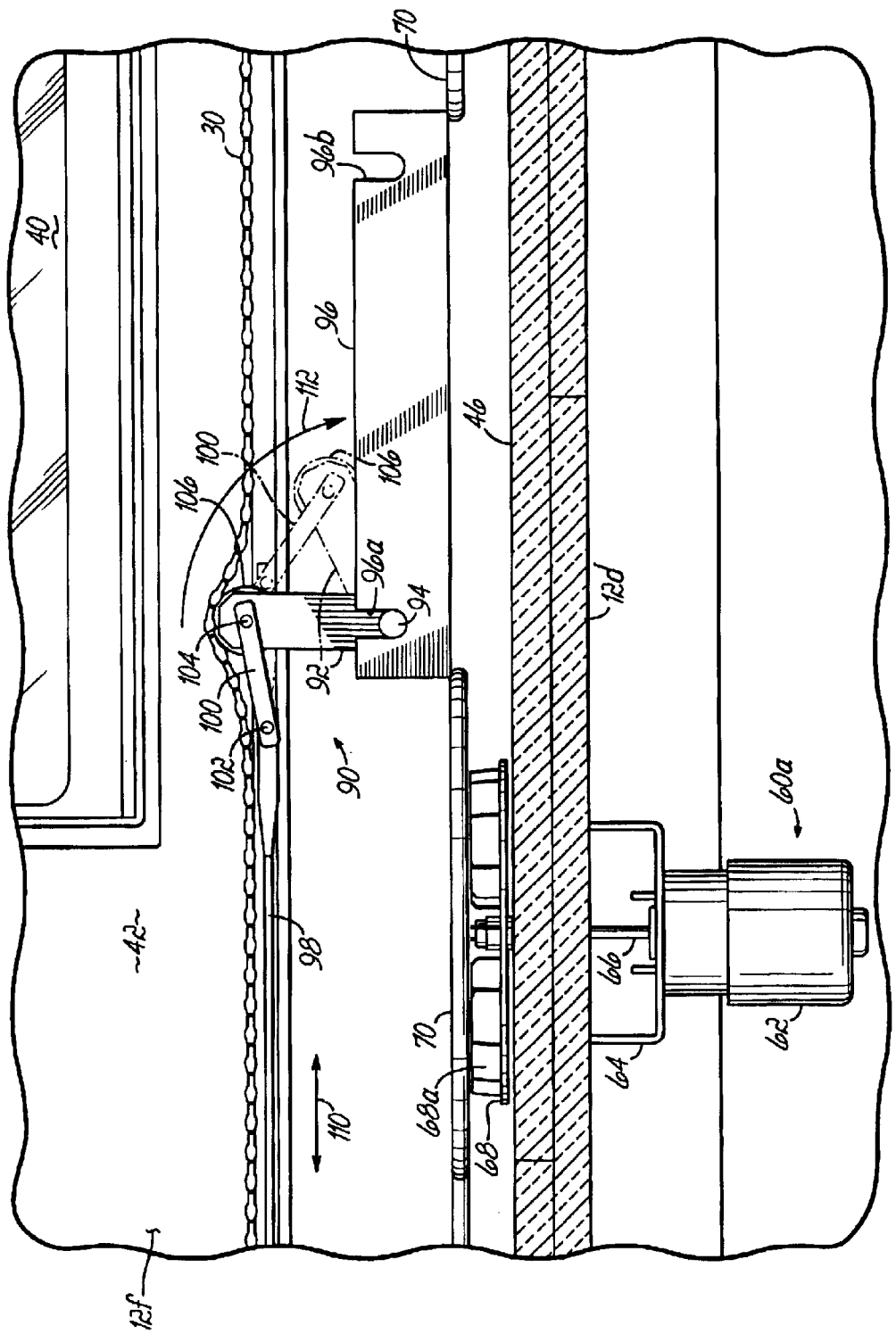
FIG. 3 is an enlarged view of a portion of the cross section shown in FIG. 2, and illustrating two different positions of the adjustable riser member.

Referring most particularly to FIGS. 3 and 4, preferably four identical air moving units 60a, 60b, 60c, 60d are provided with two units 60c, 60d located closely adjacent top wall 12c and two units 60a, 60b located closely adjacent bottom wall 12d as shown in FIG. 2. Lower air moving units 60a, 60b move air generally in an upward direction through conveyor 30 and upper air moving units 60c, 60d move air generally downwardly toward conveyor 30.

Each air moving unit 60a–d is identical and, therefore only one air moving unit 60a will be described in detail. As shown in FIGS. 3 and 4, air moving unit 60a includes an electric motor 62 secured to bottom wall 12d with a mounting bracket 64. Electric motor 62 includes a rotatable output 66 through which it rotates a fan 68 preferably in a range of 500 to 1500 rpm for most applications. Located immediately adjacent to fan 68, i.e., on the side facing conveyor belt 30, is an electric heating coil 70 coupled with a conventional heating control unit 72. Operating together, heating coils 70 maintain a temperature of about 200° F. to 400° F. within interior 42. As shown in FIG. 2, each electric heating coil 70 may include a cover 74 which is open along its side facing conveyor 30 such that the heat radiating from each coil 70 is essentially radiated toward conveyor 30. As with the top 44 and bottom 46 of interior 42, the upper and lower heaters 70 are positioned so that the conveyor belt 30 is closer to midpoint "M" than to either the upper heaters 70 or the lower heaters 70. As best shown in FIG. 4, fan 68 includes a plurality of radially extending fan blades 68a. Fan blades 68a are preferably flat and contained within vertical planes which extend radially from the axis of rotation of fan 68. In this manner, fan blades 68 have at least substantially no pitch. This ensures that fans 68 gently move the air within chamber interior 42 as opposed to forcefully directing the air in an upward or downward direction. This has been found to provide for "softer" convection characteristics and improved uniformity of temperature, i.e., the elimination of hot and cold spots within chamber interior 42.

FIG. 2 also illustrates the drive system for conveyor belt 30 generally comprised of a conventional motor and gear assembly 80 which drives one or more sprockets 82a which are toothed to engage conveyor belt 30. Preferably, conveyor belt 30 moves at a speed of about 10 ft./min. to 120 ft./min. for most applications. Sprockets 82a and any additionally necessary circular supports 82b, as shown in FIG. 1, are fixed for rotation with a shaft 84 which is operatively coupled to motor and gear assembly 80 for rotation by same. This coupling may, for example, be through a belt drive or chain drive, or the output of motor and gear assembly 80 may be directly coupled with shaft 84. In addition, any suitable drive system may be used other than a motor and gear drive assembly. In one advantageous aspect of the invention, conveyor belt 30 is a free tension belt which is under little or no tension during use. That is, conveyor belt 30 hangs freely from sprockets 82a and rotating supports 82b (FIG. 1). Thus, as discussed below, a riser bar assembly 90 may be used to raise and lower belt 30 within chamber interior 42 without generating undesirable forces and stress on belt 30 or on the riser bar assembly 90.

Adjustable riser bar assembly 90 is used to raise and lower a desired transverse section of conveyor belt 30 within chamber or housing interior 42 as shown in FIGS. 2 and 3. Raising and lowering a transverse section of belt 30 helps to ensure higher quality shrink wrapping of packages and/or product containers, and the height adjustability provided by this invention allows a wider range of package and product container sizes and configurations to be shrink wrapped in the same tunnel with more uniform, higher quality results. As best shown in FIG. 3, riser bar assembly 90 specifically comprises a pivoting support 92 which rotates from the position shown in solid lines to the position shown in dashed lines about a pivot rod 94. Pivot rod 94 is supported for rotation in a slot 96a of a stationary support plate 96. Stationary support plate 96 includes an additional slot 96b which may be used when conveyor belt 30 is moving in the opposite direction. Although not shown, there is a similar pivot and support assembly on the opposite side of conveyor belt 30.

A riser bar actuating rod 98 is coupled to a link 100 by a pivot 102. Link 100 is further coupled to pivoting support 92 by a second pivot 104. At least one roller or bearing 106 is coupled to a shaft (not shown) which is coupled to and coaxial with pivot 104. Multiple rollers 106 may be provided at spaced locations across the width of conveyor belt 30 for supporting belt 30 while providing as little obstruction to the flow of air at that location as possible. One or more rollers 106 provide reduced friction as conveyor belt 30 passes over them and briefly elevates. At this location, a product (not shown) which is encased in a shrink wrap film is also briefly elevated such that the bubble which is created by the heated shrink wrap film during the shrink wrap process is more uniformly distributed about the product or its particular package configuration. This helps ensure that the shrink wrap film itself is more evenly heated and therefore subject to less distortion and more uniform shrinking of the shrink film.

Adjustable riser bar assembly 90 allows a transverse section of the conveyor belt 30 to be elevated to different heights within a predetermined range by moving actuating rod 98 back and forth in the direction of arrow 110 as shown in FIG. 3. To accommodate most applications, the height adjustment may be in the range of 0 to 1½". When moved to the right, actuating rod 98 rotates pivot support 92 in the direction of arrow 112 to the position shown in dashed lines. Thus, the two extreme positions are shown in FIG. 3 with the solid line depiction of support 92 and roller 106 illustrating the highest elevation of conveyor belt 30 and the dashed line depiction showing roller or rollers 106 completely disengaged from conveyor belt 30. Higher elevations tend to be useful for shorter, heavier products. In the disengaged position of roller 106, conveyor belt 30 is maintained completely planar during its travel through interior 42. This position is useful, for example, when the products are prone to tip during elevation by the riser bar, or for very lightweight products which will be elevated by the shrink film bubble formed during the process and, therefore, do not need to be elevated by any additional structure. Preferably, actuating rod 98 extends to the exterior of housing 12 such that it may be operated to raise and lower conveyor belt 30 without the necessity of the operator reaching into chamber interior 42. Actuating rod 98 is secured in the desired position, thereby securing the height of conveyor belt 30 at the desired elevation, by a suitable retaining assembly also located outside of interior 42, such as a clamping structure (not shown). It will be appreciated that such a retaining assembly or device would simply prevent any further linear motion of actuating rod 98 in opposite directions indicated by arrow 110 (FIG. 3).

While the present invention has been illustrated by the description of various embodiments thereof, and while the embodiments have been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of applicants' general inventive concept.

What is claimed is:

1. Apparatus for shrink wrapping at least one product, comprising:

a housing having an interior space with an entrance and an exit;

a conveyor belt passing through the interior space along a path from the entrance to the exit, the conveyor belt having an upper surface for receiving the product, and an underside;

a heater thermally coupled to the interior space; and an adjustable riser member contacting the underside of the conveyor belt, the riser member adjustable in height to allow a section of the conveyor belt to be raised and lowered within the interior space relative to adjacent upstream and downstream sections of the conveyor belt thereby forming the upstream and downstream sections, respectively, into inclining and declining sections.

2. The apparatus of claim 1, further comprising:

an air mover operatively coupled with the housing and configured to move air within the interior space.

3. The apparatus of claim 1, wherein the conveyor belt is a free tension conveyor belt.

4. The tunnel of claim 1, wherein the riser member is a bar extending transverse to the path of the conveyor belt.

5. The tunnel of claim 1, wherein the height of the riser member is adjustable from outside the housing.

6. The tunnel of claim 1, wherein the riser member includes at least one roller engaging the underside of the conveyor belt.

7. A method of shrink wrapping at least first and second products contained in a heat shrinkable film while conveying the products on a conveyor belt through a housing having an interior with an entrance and an exit, comprising:

raising a section of the conveyor belt within the housing to form an upstream inclining section and a downstream declining section located between the entrance and the exit;

conveying the first product through the interior of the housing on the inclining and declining sections of the conveyor belt;

heating the heat shrinkable film to shrink the film around the first product;

adjusting the height of the section of the conveyor belt between the upstream inclining section and the downstream declining section;

conveying the second product through the interior of a housing; and heating the heat shrinkable film to shrink the film around the second product.

8. The method of claim 7, wherein the conveyor belt further comprises a free tension conveyor belt and conveying the product further comprises:

conveying the first and second products on the free tension conveyor belt.

9. The method of claim 7, wherein adjusting the height further comprises:

changing the vertical position of a riser member supporting an underside of the conveyor belt.

10. The method of claim 7, wherein adjusting the height further comprises:

changing the vertical position of at least one roller supporting an underside of the conveyor belt.

11. The method of claim 7, wherein adjusting the height further comprises:

adjusting the height from outside of the housing.

* * * * *